//<br>
United States Patent Office 2,734,034
Patented Feb. 7, 1956

2,734,034

MAGNETIC COMPOSITIONS

Henry L. Crowley, South Orange, N. J., assignor, by mesne assignments, to Henry L. Crowley & Company, Inc., West Orange, N. J., a corporation of New Jersey No Drawing. Application May 15, 1951,
Serial No. 226,545

4 Claims. (Cl. 252—62.5)

This invention relates to magnetic compositions and articles formed therefrom, and has for its object the provision of new and useful magnetic compositions and articles formed therefrom, as new articles of commerce, and of a method of making the same. The magnetic compositions of the invention and articles produced therefrom possess useful magnetic and electrical properties, and have a principal use as cores in inductances, transformers, deflection coils and similar devices employed in the communication and other electrical arts.

In my copending application for Letters Patent of the United States Ser. No. 145,085, filed February 18, 1950, now Patent No. 2,575,099, there are disclosed ferritic ferrite magnetic compositions, and articles formed therefrom, composed principally of a mixed ferrite and metallic iron in a very fine state of dissemination, and a method of making the same. The finely disseminated iron (in crypto-crystalline form) of the composition is formed in the course of the spontaneous dissociation of ferrous oxide when gradually cooled through at least a large part of the temperature range from about 1000° C. to about 300° C., and the mixed ferrite is formed by heat-treatment of ferric oxide and two or more oxides of metals other than iron. In the preferred compositions of that application the metal oxides other than iron are zinc oxide and nickel oxide. In the course of a further extended investigation of those preferred compositions, I have discovered lithium oxide in conjunction with magnesium oxide to be modifying metal oxides capable of replacing nickel oxide, in whole or in part, in the ferrite lattice of the mixed ferrite.

Based on the foregoing discoveries, the present invention contemplates, as new articles of commerce, magnetic compositions, and articles made therefrom, composed principally of ferro-magnetic material of which a large part is a mixed ferrite containing zinc oxide, lithium oxide and magnesium oxide. Preferably, and usually, the ferromagnetic material also contains metallic iron in a fine state of subdivision, and preferably in a finer state of subdivision than in powdered iron. The invention further contemplates the novel and improved method for making the magnetic compositions of the invention.

The magnetic compositions of the inventions are conveniently, and most advantageously, made by subjecting a mixture of ferric oxide, zinc oxide, lithium oxide and magnesium oxide to a two-stage heat-treatment, the first of which is carried out at a temperature of 800° C. to 1200° C. and the second of which is carried out at a somewhat higher temperature within the range of 1100° C. to 1450° C., with gradual cooling of the heat-treated product.

The initial oxide mixture is thoroughly mixed to produce a homogeneous dispersion of the metal oxides, so that the subsequent reactions take place uniformly throughout the entire mass of the mixture. The weight percentage of ferric oxide ($Fe_2O_3$) in the initial oxide mixture may vary from 50 to 90%, although the usual range of ferric oxide in the mixture is from 70–85%, and preferably between 70 and 75%, by weight. The lithium oxide ($Li_2O$) is preferably derived from lithium carbonate ($Li_2CO_3$), since the carbonate is commercially more readily available than the oxide. Accordingly, from 1 to 6%, and preferably from 1 to 2%, by weight of lithium carbonate is included in the initial oxide mixture. The weight percentage of zinc oxide (ZnO) in the initial oxide mixture may vary from 12 to 22%, and preferably from 15 to 21%. The weight percentage of magnesium oxide (MgO) in the initial oxide mixture may vary from 1 to 10%, and preferably from 5 to 8%. The inclusion in the initial oxide mixture of some nickel oxide (NiO), say up to around 5% by weight, imparts certain desirable properties to the finished product for certain applications, but entirely satisfactory products are obtained in the absence of any nickel oxide.

The first heat-treatment is carried out in any suitable type of kiln or furnace at a temperature between 800 and 1200° C., and usually more advantageously between 900 and 1100° C. Final products of superior magnetic and electrical properties are produced when the first heat-treatment is conducted under conditions promoting the removal of some, but not all, of the oxygen content of the ferric oxide component of the initial mixture. Although heating of the initial mixture to a temperature within the aforementioned range in an indifferent ambient atmosphere will effect significant removal of oxygen from the ferric oxide, I generally prefer to effect removal of a more substantial amount of oxygen from the ferric oxide by a reducing environment such as that provided by a reducing ambient atmosphere or by a reducing agent present in the initial mixture, or both. A reducing ambient atmosphere may be provided conveniently by the products of combustion of a controlled mixture of fuel gas with a small deficiency of air. Reducing agents suitable for incorporation in the initial oxide mixture are represented by such carbonaceous materials as dextrin, starch, flour, cellulosic substances, etc., which may be added advantageously in amounts of from about 1 to about 5% by weight of the initial oxide mixture. The initial oxide mixture may be subjected to the first heat-treatment in granular (i. e. finely divided) form, or it may be agglomerated, preferably with the aid of a suitable binder, such as dextrin or the like, which may thus serve the dual function of reducing agent and binder.

Where the oxide mixture is agglomerated during the first heat-treatment, the heat-treated agglomerates are crushed and ground. Even when the initial oxide mixture is heat-treated in granular form it is desirable to grind the heat-treated product to a predetermined particle size in order to secure better uniformity of treatment in the subsequent operations, as well as to provide such particle or crystal size as is best suited to the particular field of use of the final product or article. Grinding should be carried to a fineness of at least 95% through 325 mesh (standard Tyler screen), for most applications of the magnetic compositions.

The finely ground product of the first heat-treatment (with added binder) is compacted and pressed by any suitable apparatus into shaped articles of the shape and size predetermined by the shape and size of the final articles (e. g. a magnetic core). Due allowance should be made for shrinkage during the second heat-treatment, which may range from a few per cent up to 25%, and under the usual conditions of operation is around 10%. The added binder is preferably carbonaceous in character, such for example as a phenol formaldehyde resin, and from 1 to 3% by weight of the binder is usually satisfactory. Such an amount of a carbonaceous binder insures against undesirable oxidation of the composition of the shaped articles during the second heat-treatment yet is insufficient in itself to effect any further significant removal of oxygen from the iron oxide component of the composition during the second heat-treatment. Where such conditions can be insured by control of the ambient furnace atmosphere, the binder need not be carbonaceous.

Prior to the second heat-treatment, the shaped articles are advantageously given a curing or conditioning heat at a comparatively low temperature, say around 500–600° C. This step burns out, in part at least, the volatilizable constituents of the binder, and otherwise favorably conditions the article for the high temperature attained in the second heat-treatment. The curing heat is conveniently carried out in an externally heated retort or muffle furnace in a generally neutral atmosphere. However, if the furnace or kiln used for effecting the second heat-treatment is of sufficient capacity to permit relatively slow heating of the shaped articles to a temperature of about 500–600° C. before subjecting them to the ultimate high temperature firing conditions, the curing heat may be provided in this manner rather than in a separate retort or furnace.

The second heat-treatment is carried out in any suitable type of kiln or furnace at a temperature between 1100 and 1450° C., and usually between 1250 and 1350° C. When the shaped articles have been formed with a carbonaceous binder, the residual carbonaceous constituent of the binder (carried through to the high temperature stage of the second heat-treatment) maintains the desired internal conditions within the articles. Under these circumstances, it has been found that the ambient atmosphere, such as that provided by the presently preferred direct firing of the articles by the products of combustion of a controlled mixture of fuel gas and air, may be substantially neutral or may be appreciably reducing or oxidizing according to conventional standards without having any significant effect upon the results of the second heat-treatment. A typical second heat-treatment cycle, subsequent to the aforementioned curing stage, comprises heating to the ultimate high temperature in about four hours, retention at that temperature for about eight hours, and gradual cooling through a period of four hours. Cooling from the ultimate high temperature to around 1000° C. and from around 300° C. to room temperature may be fairly rapid, but between 1000° C. and 300° C. the heat-treated articles should be gradually cooled over a period of four to six hours.

While it is now my preferred practice to conduct the first heat-treatment with the initial oxide mixture in a reducing environment, as hereinbefore described, it is possible to conduct the heat-treatment in a non-reducing environment, provided the environment in which the shaped articles are heat-treated is of such a character that some ferrous oxide is present in the composition of the shaped articles at the conclusion of the heat treatment. Thus, the environments in which the initial oxide mixture and the shaped articles are heat-treated should be of such character that some ferrous oxide is present in the composition of the shaped articles at the conclusion of the second heat-treatment. It is my present belief that the superior magnetic and electrical properties of the compositions of the invention are due, at least in part, to the presence of ferrous oxide in the composition at the conclusion of the second heat-treatment, and to the gradual cooling of the heat-treated shaped articles through at least the greater part of the temperature range in which ferrous oxide spontaneously dissociates into metallic iron and magnetite ($Fe_3O_4$). In compositions of the invention, this dissociation appears to start shortly below the final high temperature of heat-treatment and is completed at about 300° C. In the course of the gradual cooling through the greater part of the temperature range of from about 1000° C. to about 300° C., the ferrous oxide present in the heat-treated articles is believed to spontaneously dissociate into magnetite and metallic iron in an extremely fine state of subdivision (a far finer state of dissemination than is possible in powdered iron). The finely disseminated iron is crypto-crystalline in character, and constitutes the ferritic component of the final composition. The ferrite component of the composition results from the interaction during heat-treatment of the metallic oxides in the initial oxide mixture.

One of the compositions of my aforementioned patent application currently in wide commercial use (known in the trade as Croloy 70) is made from an initial oxide mixture containing 70% $Fe_2O_3$, 20% ZnO and 10% NiO by weight. Compositions of the invention made from initial oxide mixtures containing 74–75% $Fe_2O_3$, 17–18% ZnO, 7–7.5% MgO and 1–1.5% $Li_2CO_3$ are comparable in magnetic and electrical properties to the foregoing composition (Croloy 70). Due to the present short supply of nickel and nickel compounds, these compositions of the invention are of special economic advantage since no nickel oxide is required in their manufacture. The inclusion of lithium oxide in the initial oxide mixture further permits the inclusion of somewhat higher percentages of ferric oxide, with attendant improved magnetic properties in the final article for some practical applications. In the absence of lithium oxide, products or articles made from initial oxide mixtures containing more than around 70% ferric oxide tend to crack during the second heat-treatment. By including lithium oxide (as carbonate) in the initial oxide mixture, it is possible to include up to 80%, and even slightly more, ferric oxide in the mixture.

The magnetic characteristics of the presently preferred composition of the invention (made from an initial oxide mixture of 74.3% $Fe_2O_3$, 17.35% ZnO, 7.2% MgO and 1.15% $Li_2CO_3$) are compared in the following table with Croloy 70 (hereinbefore mentioned). Measurements were made on rings of the composition, in each example.

|  | New Composition | Croloy 70 |
|---|---|---|
| Initial permeability | 450 | 500 |
| Maximum permeability | 1,200 | 1,450 |
| Saturation flux density (B max.) gauss | 3,000 | 2,700 |
| Coercive force ($H_c$) oersted | 0.6 | 0.6 |

The magnetic and electrical properties of several compositions of the invention are shown in the following table. The table gives the initial oxide mixtures from which the compositions were made and two electrical values L and S, which are comparable only in conjunction with some standard, for which purpose Croloy 70 is included as the first composition in the table. The L value is an inductance and is roughly proportional to the initial permeability of the composition. For example, Croloy 70 has an initial permeability of about 500 and an L value of about 220. The approximate initial permeability of another composition (measured with the same instruments) can be derived from the following equation:

$$\frac{\text{Initial permeability}}{L} = \frac{500}{220}$$

The saturation value S is roughly proportional to the saturation flux density (B max.). Croloy 70 has a saturation flux density value of about 2700 gauss and an S value of 20. The saturation flux density value of another composition can be derived from the following equation:

$$\frac{\text{Saturation flux density (B max.)}}{S} = \frac{2700}{20}$$

| Initial Oxide Mixture | | | | Properties of final composition | |
|---|---|---|---|---|---|
| Fe₂O₃ | ZnO | Li₂CO₃ | MgO | L | S |
| Croloy 70 | | | | 220 | 20 |
| 75.2 | 15.5 | 1.2 | 8.1 | 120 | 17.5 |
| 75.3 | 20.2 | 1.15 | 5.35 | 250 | 14.5 |
| 75.3 | 18 | 2.0 | 4.7 | 128 | 17 |
| 74.3 | 17.35 | 1.15 | 7.2 | 180 | 17.5 |
| 74.55 | 19.25 | 1.1 | 5.1 | 150 | 17 |
| 77.0 | 16.88 | 1.66 | 4.46 | 142 | 19.5 |
| 76.0 | 16.88 | 2.66 | 4.46 | 170 | 18.25 |
| 79.0 | 15.55 | 1.33 | 4.12 | 150 | 22.5 |
| 78.0 | 15.55 | 2.33 | 4.12 | 184 | 20.5 |
| 74.77 | 17.45 | 0.53 | 7.25 | 180 | 16.5 |
| 73.3 | 20.2 | 1.0 | 5.5 | 250 | 13.5 |

In the interest of simplicity, the lithium oxide included in the initial oxide mixture has herein been expressed in terms of lithium carbonate; the presently most readily available form of lithium oxide. The carbonate during heat-treatment is converted to the oxide, one part by weight of the carbonate being the equivalent of 0.4 part by weight of oxide. Throughout the specification and appended claims all recited amounts of lithium carbonate are therefore to be understood as including any other suitable lithium compound of equivalent lithium oxide content. Thus, the aforementioned range of 1 to 6% of lithium carbonate corresponds to the range of about 0.4 to 2.4% lithium oxide.

I claim:

1. The method of preparing magnetic articles having useful magnetic and electrical properties which comprises heat-treating at a temperature of 800° to 1200° C. an initial oxide mixture containing by weight from 50 to 90% ferric oxide, 12 to 22% zinc oxide, 1 to 10% magnesium oxide and 1 to 6% lithium carbonate under non-oxidizing conditions, grinding the resulting product to a fine particle size, compacting the resulting ground product into a shaped article of the shape and size predetermined by the shape and side of the final article, heat-treating the shaped article at a higher temperature within the range of 1100° to 1450° C. under non-oxidizing conditions, the non-oxidizing conditions of at least one of said heat-treatments being reducing to insure the presence of ferrous oxide in the shaped article at the conclusion of the second heat-treatment, and gradually cooling the heat-treated article through at least the greater part of the temperature range of 1000° to 300° C. in order to effect spontaneous dissociation of the ferrous oxide to form crypto-crystalline metallic iron.

2. The method of preparing magnetic articles having useful magnetic and electrical properties which comprises heat-treating at a temperature of 800° to 1200° C. an initial oxide mixture containing by weight from 50 to 90% ferric oxide, 12 to 22% zinc oxide, 1 to 10% magnesium oxide, 1 to 6% lithium carbonate and 1 to 5% carbonaceous material to promote the removal of some but not all of the oxygen content of the ferric oxide, grinding the resulting product to a fine particle size, compacting the resulting ground product with the addition of 1 to 3% by weight of a carbonaceous binder into a shaped article of the shape and size predetermined by the shape and size of the final article, heat-treating the shaped article at a higher temperature within the range of 1100° to 1450° C. under non-oxidizing conditions to insure the presence of ferrous oxide in the shaped article at the conclusion of this heat-treatment, and gradually cooling the heat-treated article through at least the greater part of the temperature range of 1000° to 300° C. in order to effect spontaneous dissociation of the ferrous oxide to form crypto-crystalline metallic iron.

3. As a new article of commerce, the magnetic composition made by the method of claim 1.

4. As a new article of commerce, a magnetic composition according to claim 3 wherein the initial oxide mixture consists essentially of 70–85% by weight of ferric oxide, 15 to 21% by weight of zinc oxide, 5 to 8% by weight of magnesium oxide, and 1 to 2% by weight of lithium carbonate.

References Cited in the file of this patent

UNITED STATES PATENTS

| 2,549,089 | Hegyi | Apr. 17, 1951 |
| 2,565,111 | Albers-Schoenberg | Aug. 21, 1951 |
| 2,575,099 | Crowley | Nov. 13, 1951 |

OTHER REFERENCES

Philips Technical Review, vol. 8, No. 12, December 1946; page 356 is pertinent. (Copy in Div. 64.)